(12) United States Patent
Hase et al.

(10) Patent No.: US 10,409,969 B2
(45) Date of Patent: Sep. 10, 2019

(54) AUTHORIZATION DEVICE THAT GRANTS AUTHORITY TO GUEST USERS

(71) Applicant: Konica Minolta, Inc., Chiyoda-ku, Tokyo (JP)

(72) Inventors: Junichi Hase, Osaka (JP); Yuki Asai, Itami (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/976,018

(22) Filed: May 10, 2018

(65) Prior Publication Data

US 2018/0330066 A1 Nov. 15, 2018

(30) Foreign Application Priority Data

May 11, 2017 (JP) ................................ 2017-094445

(51) Int. Cl.
G06F 21/31 (2013.01)
G06F 3/12 (2006.01)
G06F 21/30 (2013.01)
G06F 21/33 (2013.01)

(52) U.S. Cl.
CPC ............ *G06F 21/31* (2013.01); *G06F 3/1204* (2013.01); *G06F 3/1222* (2013.01); *G06F 3/1238* (2013.01); *G06F 3/1285* (2013.01); *G06F 21/305* (2013.01); *G06F 21/335* (2013.01)

(58) Field of Classification Search
CPC ....... G06F 21/31; G06F 3/1222; G06F 3/1238
USPC ....................................................... 358/1.14
See application file for complete search history.

(56) References Cited

U.S. PATENT DOCUMENTS

| | | | |
|---|---|---|---|
| 2007/0214494 A1* | 9/2007 | Uruta | G06F 21/608 726/2 |
| 2011/0218892 A1* | 9/2011 | Jeong | G06Q 40/12 705/30 |
| 2012/0131342 A1 | 5/2012 | Kim et al. | |
| 2016/0246975 A1 | 8/2016 | Allison | |
| 2017/0155803 A1* | 6/2017 | Nishino | G03G 15/502 |
| 2018/0081599 A1* | 3/2018 | Yamada | G06F 3/1205 |

FOREIGN PATENT DOCUMENTS

| | | |
|---|---|---|
| CN | 1464402 A | 12/2003 |
| CN | 102035846 A | 4/2011 |
| CN | 106355708 A | 1/2017 |
| JP | 2002-245010 | 8/2002 |

(Continued)

OTHER PUBLICATIONS

China Patent Application No. 201810442230.1; Office Action; dated Jul. 1, 2019; 25 pages.

*Primary Examiner* — Saeid Ebrahimi Dehkordy
(74) *Attorney, Agent, or Firm* — Baker Hostetler

(57) ABSTRACT

The image forming apparatus is an authorization device that gives authority to use of the image forming apparatus. To the host user, the authority to use of the image forming apparatus is given. The image forming apparatus evaluates depth of a relationship between a host user and a guest user different from the host user, on a service used by a plurality of users. Based on the evaluation results, the image forming apparatus gives the authority to use of the image forming apparatus to the guest user. This makes it possible to provide an authorization device capable of improving convenience while securing security.

16 Claims, 14 Drawing Sheets

(56) References Cited

FOREIGN PATENT DOCUMENTS

| JP | 2007-226428 | 9/2006 |
|----|-------------|--------|
| JP | 2007-286956 | 11/2007 |
| JP | 2008-102614 | 5/2008 |
| JP | 2015-192169 | 11/2015 |

* cited by examiner

FIG. 2

HOST USER TABLE

| HOST USER NAME | ID | pass | AUTH FOR EACH FUNCTION | |
|---|---|---|---|---|
| HR1 | 001 | me23ip1 | PRINT | Y |
| | | | SCAN | Y |
| | | | COPY | Y |
| HR2 | 002 | d73k9sa | PRINT | N |
| | | | SCAN | N |
| | | | COPY | Y |
| HR3 | 003 | 32z90xk | PRINT | N |
| | | | SCAN | Y |
| | | | COPY | Y |
| HR4 | 004 | sw9e01w | PRINT | Y |
| | | | SCAN | N |
| | | | COPY | Y |
| ... | ... | ... | ... | ... |

Y: AUTHORIZED
N: NOT AUTHORIZED

FIG. 3

SNS TABLE

| SNS NAME | SERVER (IP ADDRESS) | RELATION ON SNS | EVALUATION RESULT |
|---|---|---|---|
| 1ST SNS | *.*.*.* | CLOSE FRIEND | Y |
| | | FRIEND | Y |
| | | ACQUAINTANCE | N |
| 2ND SNS | *.*.*.* | MUTUAL FOLLOW (WITH DM) | Y |
| | | MUTUAL FOLLOW (WITHOUT DM) | N |

Y: RELATED
N: NOT RELATED

FIG. 6

(a) INFORMATION EXAMPLE FROM 1ST SNS SERVER

| CLOSE FRIEND LIST | HR1,a1,a2 |
|---|---|
| FRIEND LIST | HR1,a1,a2,b1,b2 |
| ACQUAINTANCE LIST | HR4,c1,c2,c3 |
| MESSAGE EXCHANGE WITH FORBIDDEN USER | NO |
| PARTICIPATING IN PROBLEMATIC GROUP | NO |
| DISCLOSE PROBLEMATIC KEYWORD | NO |
| NOT COMPLY SECURITY POLICY | NO |

(b) INFORMATION EXAMPLE FROM 2ND SNS SERVER

| MUTUAL FOLLOW (WITH DM) | HR1,d1,d2,d3 |
|---|---|
| MUTUAL FOLLOW (WITHOUT DM) | HR4,e1,e2,e3 |
| MESSAGE EXCHANGE WITH FORBIDDEN USER | NO |
| PARTICIPATING IN PROBLEMATIC GROUP | NO |
| DISCLOSE PROBLEMATIC KEYWORD | NO |
| NOT COMPLY SECURITY POLICY | NO |

FIG. 10

GUEST USER TABLE

| GUEST USER NAME | SNS NAME | SNS ACCOUNT ID | SNS ACCOUNTpass | AUTH FOR EACH FUNCTION | | HOST USER DEEPLY RELATED | |
|---|---|---|---|---|---|---|---|
| GR1 | 1ST SNS | a7902 | 3rk90s1 | PRINT | Y | HR1 | |
| | | | | SCAN | Y | | |
| | | | | COPY | Y | | |
| GR2 | 1ST SNS | a8981 | d21mj89 | PRINT | N | HR2 | 1 |
| | | | | SCAN | N | HR3 | 2 |
| | | | | COPY | Y | HR1 | 3 |
| GR3 | 2ND SNS | b1775 | ef2775i | PRINT | N | HR3 | |
| | | | | SCAN | Y | | |
| | | | | COPY | Y | | |
| ... | ... | ... | ... | ... | ... | ... | |

Y: AUTHORIZED
N: NOT AUTHORIZED

AUTHORIZATION DEVICE THAT GRANTS AUTHORITY TO GUEST USERS

This application claims priority to Japanese Patent Application No. 2017-94445, which was filed on May 11, 2017, the entire disclosure of which is incorporated herein by reference.

BACKGROUND

Technological Field

The present invention relates to an authorization device and a control program for an authorization device. More specifically, the present invention relates to an authorization device for granting authority and a control program for the authorization device.

Description of the Related Art

Among electrophotographic image forming apparatuses, there are an MFP (Multi Function Peripheral) equipped with a scanner function, a facsimile function, a copying function, a function as a printer, a data communication function, and a server function, a facsimile machine, a copying machine, a printer, and so on.

In order to limit users who use the image forming apparatus, some image forming apparatuses have a function of user authentication. In the image forming apparatus having the function of user authentication, information (ID (Identification), password, etc.) of users who are permitted to use the image forming apparatus is registered in the database held by the image forming apparatus in advance by an administrator or the like. The image forming apparatus determines whether to grant the authority to use of the image forming apparatus to a user by comparing information entered by the user with the information registered in the database.

Techniques for granting authority to use of a device are disclosed in, for example, Documents 1 to 5 below. Document 1 below discloses an information process system that generates an authority delegation ID for delegating an authority for performing a predetermined process to another person based on a user ID, when a client inputs the user ID. The information process system outputs the generated authority delegation ID, and registers the generated authority delegation ID in an authority delegation table. When a contractor enters the authority delegation ID, this information process system collates with the authority delegation table, and if it is authenticated, it executes processing.

Document 2 below discloses an information processing device that allows a host user who granted authority, to grant authority to yet another guest user. This information processing device stores user authentication information for authenticating a user and authority information indicating authority of information processing in association with each other. The information processing device searches whether or not the entered user authentication information is stored in a user registration information storage means. When the entered user authentication information is stored, the information processing device determines whether registration of the new user authentication information is allowed or not, based on the authority information corresponding to the user authentication information. The information processing device activates the user registration process if it determines to allow. The information processing device causes the user registration information storage means to store the user authentication information newly entered in this user registration process.

Document 3 below discloses a usage authority management server including a usage authority definition table for storing the relationship between each authority for usage and personnel attributes as grant condition of the authority for usage. The usage authority management server searches a personnel database with an employee code corresponding to the user ID attached to the inputted processing request. This usage authority management server extracts personnel attributes including the organization and title of the employee code. This usage authority management server extracts the authority for usage corresponding to the extracted personnel attributes from the usage authority definition table. The usage authority management server sets the extracted authority for usage to the authority for usage allocated to the user ID.

In the following Document 4, an account management system is disclosed. The account management system has a front-end part and a back-end part. The front-end part accepts the account ID assignment request, inputs the user's personal information, and examines it. If the examination result is OK, the front-end part instructs creation of the account ID and registration of the user entry in the system resource requested to use. The back-end part registers the user entry in the system resource requested by the front-end part, and creates the account ID. The front-end part is connected to the user via a communication network. Requests for creation of the account ID information and personal information are input via a communication network.

Document 5 below discloses a communication server apparatus. The communication server apparatus includes a communication unit for communicating with a communication terminal, a social management unit that provides an SNS (social networking service) and manages social relationship information showing the relationship among users in the SNS in association with user identification information of users having a relationship, a terminal management unit that manages terminal identification information of communication terminals possessed by users in association with user identification information, a terminal usage authority management unit that grants and manages the authority for usage set to the communication terminals managed by the terminal management unit in association with the social relationship information of the users who own the communication terminals, and a communication control unit to control communication according to the authority for usage of the connection destination communication terminals managed by the terminal usage authority management unit in association with the social relationship information among users possessing communication terminals, in communication between communication terminals.

PRIOR ART DOCUMENTS

Document(s) Related Patent

[Document 1] Japanese Unexamined Patent Publication No. 2008-102614

[Document 2] Japanese Unexamined Patent Publication No. 2007-286956

[Document 3] Japanese Unexamined Patent Publication No. 2007-226428

[Document 4] Japanese Unexamined Patent Publication No. 2002-245010

[Document 5] Japanese Unexamined Patent Publication No. 2015-192169

In the conventional technique for giving the authority to use of the device, when a user intends to use a new device, it is necessary for a person other than the user, such as a person having the authority to use of the device and an administrator, to register the user in the database. For this reason, the convenience was low.

Here, the following method is conceivable as a method for easily giving the authority to use of the device. That is, it accepts input of an SNS ID and a password that a user is using and that the device is cooperating with, and grants the authority to use of the device when the login to the server of the SNS succeeds with the input ID and password. In this method, however, anyone who uses the SNS cooperating with the device is granted the authority to use of the device. A problem occurs in the security of the device.

The above problem is not limited to the authorization device that grants the authority to use of the device, but is a common problem in the authorization device that grants the authority.

SUMMARY

The present invention is intended to solve the above problems, and an object thereof is to provide an authorization device and an authorization device control program capable of improving convenience while securing security.

To achieve at least one of the abovementioned objects, according to an aspect of the present invention, a authorization device reflecting one aspect of the present invention comprises a hardware processor, to grant authority wherein the hardware processor evaluates depth of relationship on a service used by a plurality of users, between a host user to whom an authority was given and a guest user different from the host user, and the hardware processor grants an authority to the guest user, based on the evaluation result.

According to another aspect of the invention, a non-transitory computer-readable recording medium storing a controlling program for an authorization device to grant authority, wherein the program causes a computer to execute the steps of: evaluating depth of relationships on a service used by a plurality of users, between a host user to whom an authority is given and a guest user different from the host user, and granting an authority to the guest user, based on the evaluation result.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 2 is a diagram showing a host user table stored in the storage device 104 by the image forming apparatus 100, according to an embodiment of the present invention.

FIG. 3 is a diagram showing an SNS table stored in the storage device 104 by the image forming apparatus 100, according to an embodiment of the present invention.

FIG. 6 is a diagram showing an example of information acquired by the image forming apparatus 100 from the cloud server 200a in the embodiment of the present invention.

FIG. 10 is a diagram showing a guest user table stored in the storage device 104 by the image forming apparatus 100, according to an embodiment of the present invention.

DETAILED DESCRIPTION OF EMBODIMENTS

Hereinafter, one or more embodiments of the present invention will be described with reference to the drawings. However, the scope of the invention is not limited to the disclosed embodiments.

In the following embodiments, a description will be given of a case where the authorization device is an image forming apparatus and an authority for using the image forming apparatus (an authority to use of the image forming apparatus) is granted. In the case where the authorization device gives the authority to use of the image forming apparatus, the authorization device may be a device separate from the image forming apparatus (for example, an image reading apparatus, a server, a PC (Personal Computer), a tablet terminal, a smartphone, or the like). In addition, the authority given by the authorization device may be authority to use of a device other than the image forming device (for example, authority to use of an image reading device, a car, a coin locker, etc.). In addition, the authority granted by the authorization device may be an authority other than the authority to use of the device (for example, entry authority to enter the room, authority to apply for a prize, entry authority to join a group, etc.). In the following embodiments, a case where the image forming apparatus is an MFP will be described. Besides the case where the image forming apparatus is an MFP, it may be a printer, a copying machine, a facsimile, or the like.

[Configuration of the Authority Granting System]

First, the configuration of the authority granting system in this embodiment will be described.

Figure 1:
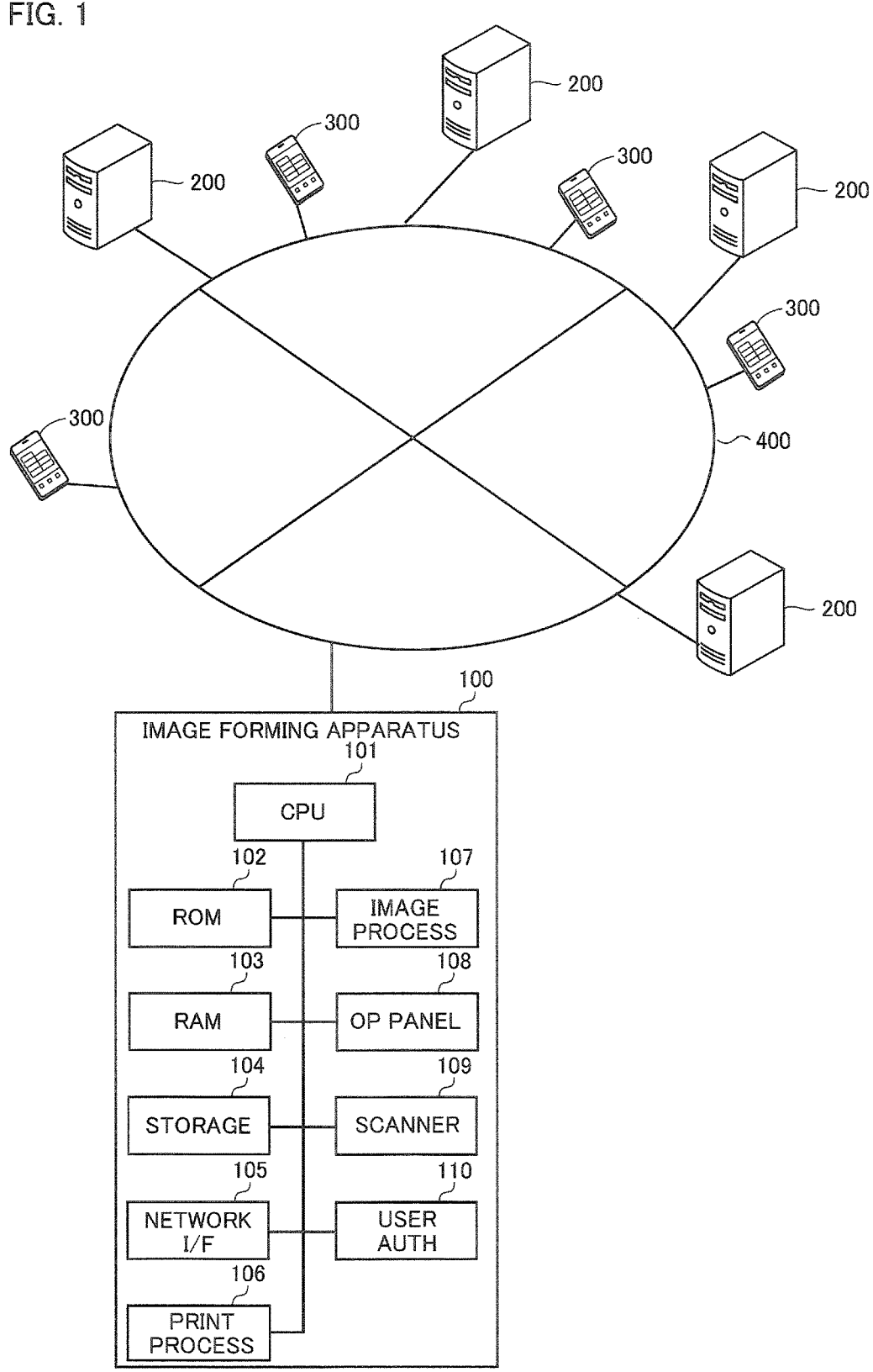
FIG. 1 is a block diagram conceptually showing a configuration of an authority granting system according to an embodiment of the present invention.

FIG. 1 is a block diagram conceptually showing a configuration of an authority granting system according to an embodiment of the present invention.

Referring to FIG. 1, the authority granting system according to the present embodiment includes an image forming apparatus 100 (an example of an authorization device), a plurality of cloud servers 200, and a plurality of terminals 300. The image forming apparatus 100, each of the plurality of cloud servers 200, and the plurality of terminals 300 are mutually connected via the Internet 400 and mutually communicate.

Each of the plurality of cloud servers 200 provides a service such as an SNS. Each of the plurality of cloud servers 200 includes a CPU (Central Processing Unit), ROM (Read Only Memory), RAM (Random Access Memory), HDD (Hard Disk Drive), a network interface, and the like.

Each of the plurality of terminals 300 is possessed by each of a plurality of users. The user can use the service provided by each of the plurality of cloud servers 200 through its own terminal 300. Each of the plurality of cloud servers 200 includes a CPU, a ROM, a RAM, an HDD, a network interface, and the like.

The image forming apparatus 100 includes a CPU 101, a ROM 102, a RAM 103, a storage device 104, and a network interface 105. The image forming apparatus 100 includes a print processing unit 106, an image processing unit 107, an operation panel 108, a scanner unit 109, a user authenticating unit 110, and the like. To the CPU 101, a ROM 102, a RAM 103, a storage device 104, a network interface 105, a print processing unit 106, an image processing unit 107, an operation panel 108, a scanner unit 109, and a user authentication unit 110 are connected via a bus.

The CPU 101 controls the entire image forming apparatus 100 for various jobs such as a scan job, a copy job, a mail transmission job, and a print job. Further, the CPU 101 executes the control program stored in the ROM 102.

The ROM 102 is, for example, a flash ROM. In the ROM 102, various programs executed by the CPU 101 and various fixed data are stored. The ROM 102 may be a non-rewritable one.

The RAM 103 is a main memory of the CPU 101. The RAM 103 is used for temporarily storing data and image data necessary for the CPU 101 to execute various programs. The RAM 103 temporarily stores settings received from the user regarding the job executed by the MFP 100.

The storage device 104 is configured with, for example, a HDD, and stores various data.

The network interface 105 communicates with other devices on the Internet 400 according to a communication protocol such as TCP/IP in accordance with an instruction from the CPU 101.

The print processing unit 106 performs a printing process of forming an image on a sheet or the like, based on the image data processed by the image processing unit 107.

The image processing unit 107 performs RIP (Raster image processing) on print data, and conversion processing for converting the format of the data when transmitting the data to the outside.

The operation panel 108 includes a display unit including a touch panel display and the like, and an input unit including hardware keys and software keys displayed on the touch panel display. The operation panel 108 receives various inputs from the user and displays various information to the user.

The scanner unit 109 reads the document image.

The user authenticating unit 110 permits the user to use the device based on the entered user's ID, password, and the like. The user authenticating unit 110 also gives the user the authority to use of the image forming apparatus 100 based on the entered user's ID, password, and the like.

In the following description, the user to whom the authority to use of the image forming apparatus 100 was given may be referred to as a host user, and the user different from the host user may be referred to as a guest user.

The image forming apparatus 100 evaluates the depth of the relationship between the host user and the guest user on the service used by a plurality of users. The image forming apparatus 100 gives the authority to use of the image forming apparatus 100 to the guest user based on the evaluation result.

FIG. 2 is a diagram showing a host user table stored in the storage device 104 by the image forming apparatus 100, according to an embodiment of the present invention.

Referring to FIG. 2, the host user table is a table in which information on host users of image forming apparatus 100 is recorded. In the host user table, information on each host user's name, the ID, the password, and the presence/absence of authority to use of each function (here, a print function, a scan function, and a copy function) of the image forming apparatus 100 is described.

According to the host user table, for example, the host user named "HR 2" has the ID "002" and the password "d73k9sa". Also, it is understood that the host user named "HR 2" has the authority to use of the copy function, and does not have the authority to use of the print function and the scan function.

When accepting the input of the information of an account of the image forming apparatus 100 from a user, the image forming apparatus 100 compares the input ID and the password with the ID and the password described in the host user table. If these match, the image forming apparatus 100 determines that the user who input the information is a host user. The image forming apparatus 100 gives the authority to use of the functions of which the user has the authority described in the host user table to the user who input the information.

The host user table is created by an administrator or the like of the image forming apparatus 100.

FIG. 3 is a diagram showing an SNS table stored in the storage device 104 by the image forming apparatus 100 according to an embodiment of the present invention. In FIG. 3, the IP (Internet Protocol) addresses are indicated by asterisks, but these are actually numeric strings.

Referring to FIG. 3, the SNS table is a table in which information of SNSs cooperating with the image forming apparatus 100 (SNSs of which the image forming apparatus 100 can evaluate the depth of relationship with the guest user) is recorded. In the SNS table, information (such as the IP address) of the server that provides SNS, the types of relationship between the guest user and the host user on the SNS, and information on the evaluation result of the presence or absence of the relationship on the SNS between the guest user and the host user for each of the types, are recorded.

According to the SNS table, the image forming apparatus 100 cooperates with a first SNS and a second SNS. Note that the first SNS is assumed to be Facebook (registered trademark), and the second SNS is assumed to be Twitter (registered trademark).

In the first SNS, when the host user and the guest user have a predetermined cooperative relationship on the first SNS, it is evaluated that the relationship between the host user and the guest user on the first SNS is deep. That is, when the relationship between the guest user and the host user on the SNS is "close friends" or "friends", the relationship between the guest user and the host user on the first SNS is evaluated as deep. When the relationship between the guest user and the host user on the first SNS is "acquaintance", it is evaluated that the relationship between the guest user and the host user on the first SNS is not deep. This is because in the first SNS, it is presumed that the relationship with the guest user is deep in the order of "close friends", "friends" and "acquaintance".

In the second SNS, when the host user and the guest user have exchanged messages on the service, the relationship between the host user and the guest user on the second SNS is evaluated as deep. That is, when the relationship between the guest user and the host user on the SNS is "mutual follow-up and DM (direct message) exchanged" in the second SNS, the relationship between the guest user and the host user on the second SNS is evaluated as deep. If the relationship between the guest user and the host user on the SNS is "mutual follow-up, but there is no DM interaction", it is evaluated that the relationship between the guest user and the host user on the second SNS is not deep. This is because, when the guest user and the host user did not exchange DMs, the relationship between the guest user and the host user is assumed to be thin, as compared with the case where the guest user and the host user are exchanging DMs.

The SNS table is created by an administrator or the like of the image forming apparatus 100. As described above, by registering the SNSs in cooperation with the image forming apparatus 100 in the SNS table, it is possible to restrict SNSs usable for the login of the guest users. It is possible to prevent deterioration of security caused by permitting login using unknown SNSs.

[Basic Operation of the Authority Granting System]

Subsequently, the basic operation of the authority granting system in this embodiment will be described.

Figure 4:
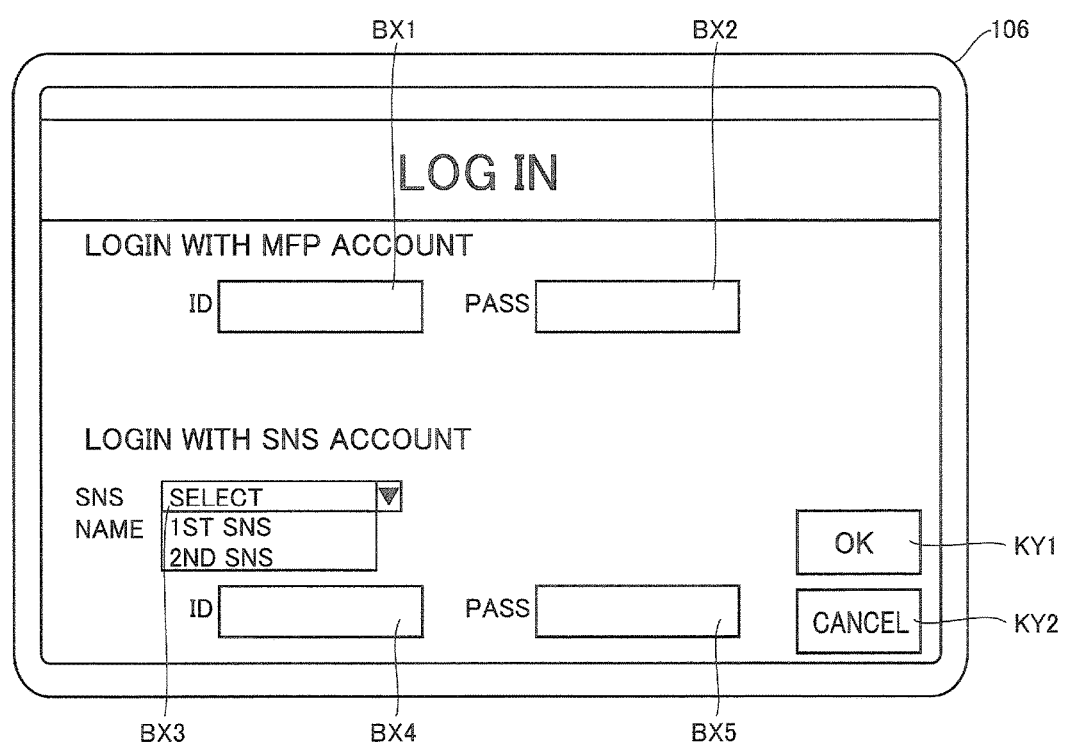
FIG. 4 is a diagram schematically showing a login screen displayed on an operation panel in an embodiment of the present invention.

FIG. 4 is a diagram schematically showing a login screen displayed on the operation panel 108 in an embodiment of the present invention.

Referring to FIG. 4, the image forming apparatus 100 displays a login screen on the operation panel 108 in a predetermined case, and acquires information necessary for granting authority to use through the login screen.

The login screen includes boxes BX 1, BX 2, BX 3, BX 4, and BX 5 and keys KY 1 and KY 2. Each of the boxes BX 1 and BX 2 is a box for inputting each of the ID and the password of an account of the image forming apparatus 100, when the user logs in with the account of the image forming apparatus 100. Box BX 3 is a combo box for selecting the type of SNS to log in when the user logs in with the account of SNS. Here, "first SNS" and "second SNS" can be selected by the list of the box BX 3. Each of the boxes BX 4 and BX 5 is a box in which the user inputs each of the ID and password of the SNS account, when the user logs in with the SNS account. The key KY 1 is an "OK" key for confirming the contents entered in the login screen. The key KY 2 is a "cancel" key for canceling the contents entered in the login screen.

Figure 5:
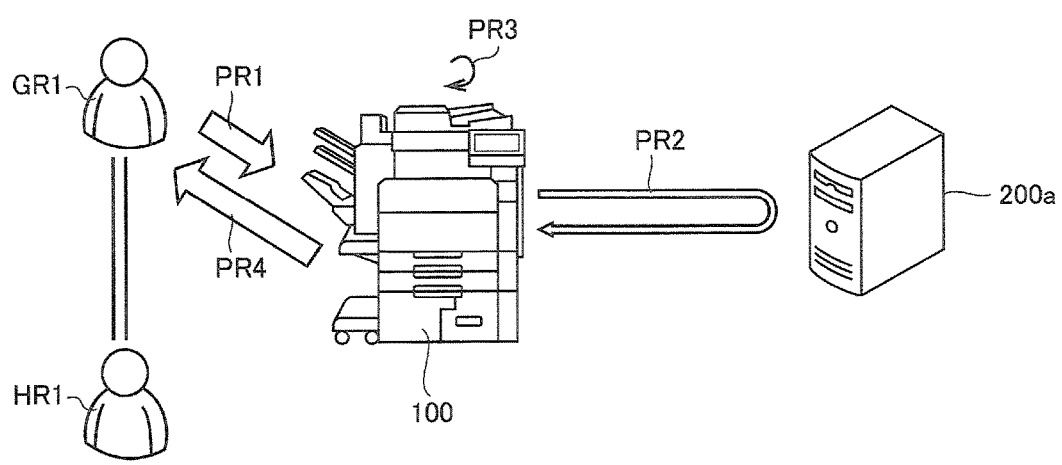
FIG. 5 is a diagram conceptually showing an operation of an authority granting system according to an embodiment of the present invention.

FIG. 5 is a diagram conceptually showing the operation of the authority granting system according to the embodiment of the present invention.

Referring to FIGS. 4 and 5, when the user who is going to log in to the image forming apparatus 100 is a host user, the user has an account of the image forming apparatus 100 and can log in with the account of the image forming apparatus 100. In this case, the user inputs his/her account information (ID and password) of the image forming apparatus 100 to each of the boxes BX 1 and BX 2, and presses the key KY 1. The image forming apparatus 100 compares the entered ID and password with the host user table.

When the entered ID and password match the ID and password described in the host user table, the image forming apparatus 100 determines that the user who input information is a host user. The image forming apparatus 100 permits the user who input information to use the functions associated with the matched ID and password in the host user table.

Next, it is assumed that the user attempting to log in to the image forming apparatus 100 is the guest user GR 1. The guest user GR 1 does not have an account of the image forming apparatus 100 and does not have the authority to use of the image forming apparatus 100. In this case, the guest user GR 1 selects the SNS that he/she is using in the box BX 3 and inputs the information (ID and password) of the account of the SNS used by himself/herself in each of the boxes BX 4 and BX 5. Thereafter, the user presses the key KY 1. As a result, the image forming apparatus 100 accepts the selection of the SNS and the input of the SNS account information from the guest user GR 1 (process PR 1).

The method for acquiring the information necessary for granting authority to use by the image forming apparatus 100 is arbitrary. The image forming apparatus 100 may obtain information from the terminal 300 via the Internet 400, for example, or may acquire information from an ID card owned by each user.

The image forming apparatus 100 refers to the SNS table and accesses the cloud server 200a which is the cloud server 200 of the selected SNS based on the information of the server of the selected SNS. Next, the image forming apparatus 100 transmits the entered ID and password to the cloud server 200a, thereby acquiring the information registered in the SNS of the guest user GR 1 from the cloud server 200a (process PR 2).

FIG. 6 is a diagram showing an example of information acquired by the image forming apparatus 100 from the cloud server 200a in the embodiment of the present invention. FIG. 6(a) is information acquired when the cloud server 200a is the cloud server 200 of the first SNS. FIG. 6(b) shows the information acquired when the cloud server 200a is the second SNS cloud server 200.

Referring to FIG. 6(a), when the cloud server 200a is the cloud server 200 of the first SNS, the information acquired from the cloud server 200a includes the following information: information (such as name) of the users described in the "close friend list" of the guest user GR 1, information on the users described in the "friend list" of the guest user GR 1, information on the users described in the "acquaintance list" of the guest user GR 1, and information on the presence or absence of problem behavior (an example of predetermined behavior) of the guest user GR 1.

The information on the presence or absence of the problem behavior of the guest user is information on the presence or absence of problem behavior on the SNS service of the guest user. Information on the presence or absence of problem behavior includes the following information, such as information on whether or not the guest user has exchanged a message with a predetermined forbidden user on the SNS (for example, a user who was able to use SNS and forcibly the account was stopped for some reason), information on whether or not the guest user is participating in a problematic group on SNS (for example, a community on the SNS where a user who was able to use SNS and forcibly the account was stopped due to some reasons participated, etc.), information on whether the guest user is disclosing problematic keywords on SNS (for example, keywords prohibited on the SNS in advance, keywords including a file name handled in the image forming apparatus 100 in the past, etc.), and information on whether or not there is a fact that the guest user does not comply with the predetermined security policy on the SNS (for example, a security policy equivalent to the security policy applied in the image forming apparatus 100 (for example, the number of days elapsed after the last password change, etc.)).

Here, the information acquired from the cloud server 200a includes information on three users "HR 1, a1, a2" as the "close friend list" of the guest user GR 1. Information of five users "HR 1, a1, a2, b1, b2" is included as a "friend list" of the guest user GR 1. Information of four users "HR 4, c1, c2, c3" is included as the "acquaintance list" of the guest user GR 1. In addition, there is no information that there is a problem behavior in the information on the presence or absence of the problem behavior of the guest user GR 1.

Referring to FIG. 6(b), when the cloud server 200a is the second SNS cloud server 200, the information acquired from the cloud server 200a includes the following information, such as a list of users who have mutual follow-up with guest user GR 1 and have DM exchanges with guest user GR 1, a list of users who have mutual follow-up with the guest user GR 1 but who do not have DM exchanges with guest user GR 1, and information on the presence or absence of problem behavior of guest user GR 1.

In this case, the information acquired from the cloud server 200a includes information on four users "HR 1, d1, d2, d3" as a "list of users who have mutual follow-up and DM exchanges" with the guest user GR 1. The information acquired from the cloud server 200a contains information on four users "HR 4, e1, e2, e3" as a "list of users who have mutual follow-up but no DM interaction" with the guest user GR 1. In addition, there is no information that there is a problem behavior in the information on the presence or absence of the problem behavior of the guest user GR 1.

With reference to FIGS. 5 and 6, the image forming apparatus 100 determines whether to grant authority to use to the guest user GR 1, based on the information acquired from the cloud server 200a (process PR 3). The image forming apparatus 100 determines whether to grant authority to use to the guest user GR 1, based on the evaluation result of the presence or absence of problem behavior on the SNS of the guest user GR 1 and the evaluation result of the depth of the relationship on the SNS provided by the cloud server 200a between the host user and the guest user GR 1.

When it corresponds to at least one of the following cases, such as a case in which the guest user has exchanged a message with a predetermined prohibited user on the SNS, a case in which the guest user is joining a problematic group on SNS, a case in which the guest user discloses problematic keywords on SNS, and a case in which there is a fact that the guest user does not comply with the predetermined security policy on the SNS, the image forming apparatus 100 evaluates that there is a problem behavior on the SNS of the guest user GR 1. At this case, the image forming apparatus 100 does not grant authority to use to the guest user GR 1 and does not permit use of the image forming apparatus 100, regardless of presence or absence of a host user deeply related to guest user GR1 on the SNS. As the problem behavior on the SNS of the guest user, it is possible for the image forming apparatus 100 to set arbitrary behavior.

On the other hand, when it does not correspond to any of the above cases, the image forming apparatus 100 evaluates that there is no problem behavior on the SNS of the guest user GR1. In this case, the image forming apparatus 100 evaluates the depth of the relationship on the SNS provided by the cloud server 200a between the host user and the guest user GR 1, and grants the authority to use based on the evaluation result. This evaluation is performed based on the information acquired from the cloud server 200a using the SNS table and the host user table.

Specifically, when the cloud server 200a is the cloud server 200 of the first SNS (when the image forming apparatus 100 receives the information shown in FIG. 6(a)), and when there is the host user (host user HR 1 in this case) included in at least one of "close friend list" and "friend list" of the guest user GR 1 (the type of relationship on the SNS indicated as "Y" in the column of the relation evaluation result in the SNS table (FIG. 3)), the image forming apparatus 100 evaluates that the relationship between the host user and the guest user GR 1 is deep. The image forming apparatus 100 refers to the host user table (FIG. 2). The image forming apparatus 100 gives the same authority to use as the authority to use granted to the host user HR 1 (authority to use of print function, scan function, and copy function) to the guest user GR 1. The image forming apparatus 100 permits the use of these functions (process PR 4). In FIG. 6(a), there is a host user "HR 4" included in the "acquaintance list" of the guest user GR 1. However, this fact is not taken into account in the evaluation.

On the other hand, when the host user is not included in the "close friend list" and "friend list" of the guest user GR 1, the image forming apparatus 100 evaluates that the relationship between the host user and the guest user GR 1 is not deep. The image forming apparatus 100 does not grant authority to use to the guest user GR 1 and does not permit use of the image forming apparatus 100.

With reference to FIG. 5 and FIG. 6(b), in a case where the cloud server 200a is the second SNS cloud server 200 (when the image forming apparatus 100 receives the information shown in FIG. 6(b)), and when there is the host user (host user HR 1 in this case) included in the "users who have mutual follow-up and DM exchanges" of the guest user GR 1 (the type of relationship on the SNS indicated as "Y" in the column of the relation evaluation result of the SNS table (FIG. 3)), the image forming apparatus 100 evaluates that the relationship between the host user HR 1 and the guest user GR 1 is deep. The image forming apparatus 100 refers to the host user table (FIG. 2). The image forming apparatus 100 gives the authority to use of the print function, the scan function, and the copy function which are the same authority to use as the authority to use determined based on the authority to use granted to the host user HR 1, to guest user GR1. The image forming apparatus 100 permits the use of these functions (process PR 4). In FIG. 6(b), there is a host user named "HR 4" contained in the "list of users who have mutual follow-up but no DM exchange" of the guest user GR 1. However, this fact is not taken into account in the evaluation.

On the other hand, if the host user is not included in the "list of users who have mutual follow-up and DM exchanges" of the guest user GR 1, the image forming apparatus 100 evaluates that the relationship between the host user and the guest user GR 1 is not deep. The image forming apparatus 100 does not grant authority to use to the guest user GR 1 and does not permit use of the image forming apparatus 100.

[How to Determine the Type of Authority to use to Grant to a Guest User, when there are Multiple Host Users Evaluated as Deeply Related to the Guest User on SNS]

Next, a method of determining the type of authority to use to be given to a guest user, when there are a plurality of host users evaluated as having a deep relationship with a guest user on the SNS will be described.

In this column, it is assumed that the guest user GR who does not have the authority to use of the image forming apparatus 100 performs the login operation for the first time in the image forming apparatus 100. There is no problem behavior on the guest user GR on the SNS. The image forming apparatus 100 assigns the authority to use of the image forming apparatus 100 to the guest user GR, based on the evaluation result of the depth of the relation between the host users and the guest user GR.

Figure 7:
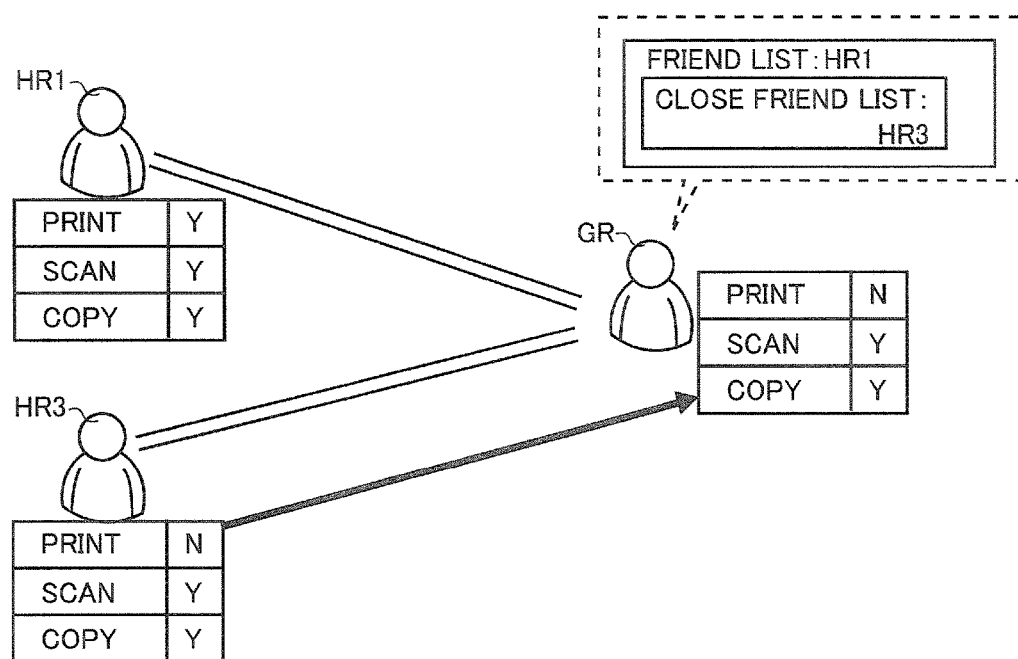
FIG. 7 is a diagram conceptually showing a first example of authority to use granted to a guest user GR in one embodiment of the present invention, in the case where there are multiple host users evaluated that they are deeply related to the guest user GR on the SNS.
Figure 8:
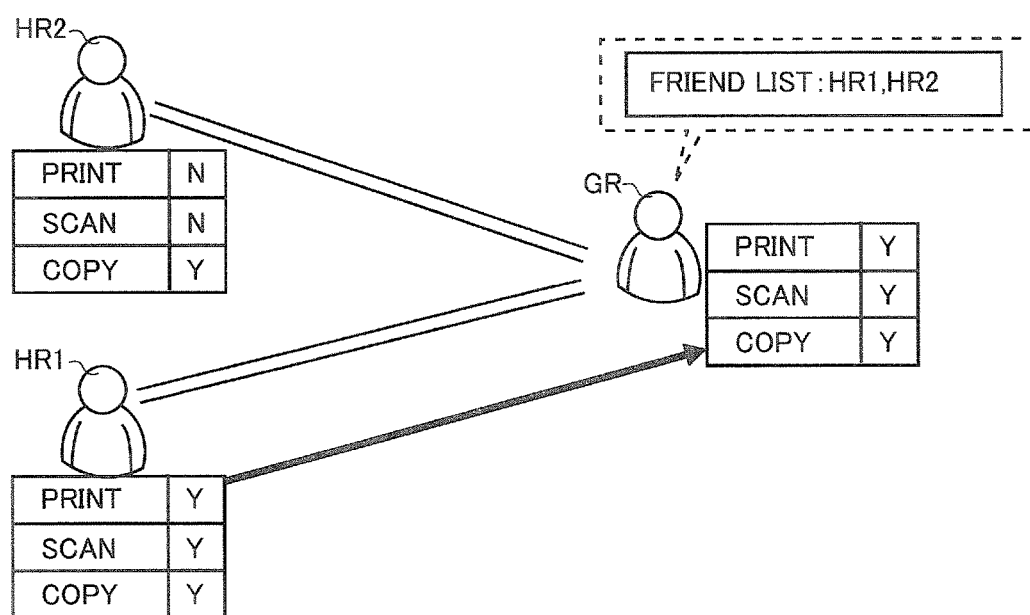
FIG. 8 is a diagram conceptually showing a second example of authority to use granted to a guest user GR in one embodiment of the present invention, in the case where there are multiple host users evaluated that they are deeply related to the guest user GR on the SNS.
Figure 9:
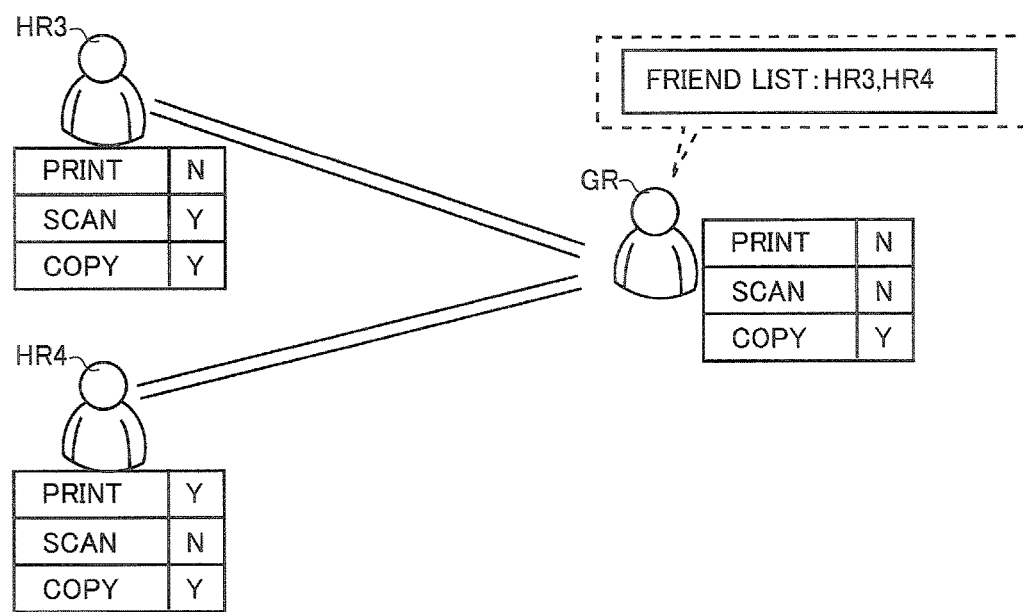
FIG. 9 is a diagram conceptually showing a third example of authority to use granted to a guest user GR in one embodiment of the present invention, in the case where there are multiple host users evaluated that they are deeply related to the guest user GR on the SNS.

FIGS. 7 to 9 are diagrams conceptually showing an example of authority to use granted to the guest user GR, when there are multiple host users evaluated that the relationship with the guest user GR on the SNS is deep, in one embodiment of the present invention, With reference to FIG. 7, in the first example, the following situation is assumed. The guest user GR uses the first SNS. The "friend list" of the guest user GR includes the host users HR 1 and HR 3. The "close friend list" includes the host user HR 3. The host users HR 1 and HR 3 have different authority to uses. The host user HR 1 has the authority to use of the print function, the scan function, and the copy function of the image forming apparatus 100. The host user HR 3 has authority to use of the scan function and the copy function of the image forming apparatus 100.

In this example, the image forming apparatus 100 determines the same authority to use as the authority to use granted to the host user HR 3 (authority to use of the scan function and the copy function), for granting to the guest user GR. Since the host user HR 3 is the host user most closely related to the guest user GR among the host users HR 1 and HR 3.

In the first example, when there are multiple host users having the same degree of relationship with the guest user GR 1 (when there are a plurality of host users registered in the "close friend list"), the host user who is the longest in relation period to the guest user GR 1 (the period registered in the "close friend list") is evaluated as the most relevant to the guest user GR.

Referring to FIG. 8, in the second example, the following situation is assumed. The guest user GR uses the first SNS, and the "friend list" of the guest user GR includes the host users HR 1 and HR 2. The host users HR 1 and HR 2 have different authorities to use. The host user HR 1 has authority to use of the print function, the scan function, and the copy function (three functions) of the image forming apparatus 100. The host user HR 2 has authority to use of the copy function (one function) of the image forming apparatus 100.

In this example, the image forming apparatus 100 determines the authority to use of the print function, the scan function, and the copy function that are the same authority to use as the authority to use granted to the host user HR 1, as authority to use granted to guest user GR. The host user HR 1 is a host user who is granted the authority to use of the most functions among the host users HR 1 and HR 2.

Referring to FIG. 9, in the third example, the following situation is assumed. The guest user GR uses the first SNS. Guest user GR's "friend list" includes host users HR 3 and HR 4. Host users HR 3 and HR 4 have different authorities to use. The host user HR 3 has authority to use of the scan function and the copy function of the image forming apparatus 100. The host user HR 4 has the authority to use of the print function and the copy function of the image forming apparatus 100.

Based on the authority to use commonly given to all the host users HR 3 and HR 4 (authority to use satisfying the AND condition of authorities to use granted to the host users HR 3 and HR 4), in this example, the image forming apparatus 100 determines the authority to use to be given to the guest user GR. Here, the authority to use of the copy function which is the authority to use granted commonly to all the host users HR 3 and HR 4 is determined as the authority to use to give to the guest user GR.

Based on the authority to use granted to at least one of the host users HR 3 and HR 4 (authority to use that satisfies the OR condition of authorities to use granted to the host users HR 3 and HR 4), in this example, the image forming apparatus 100 may determine the authority to use to be given to the guest user GR.

When there are multiple host users who evaluated that the relationship with the guest user on SNS is deep, whether the method of any of the first to third examples is used may be set by the administrator of the image forming apparatus 100 or the like.

[Operation of the Authority Granting System when a Guest User having Authority to Use of the Image Forming Apparatus Logs In]

When the guest user having the authority to use of the image forming apparatus 100 performs the login operation with the information of the SNS account, the image forming apparatus 100 permits the guest user to use the image forming apparatus 100 without accessing the cloud server 200 of the SNS by the following method.

FIG. 10 is a diagram showing a guest user table stored in the storage device 104 by the image forming apparatus 100 in the embodiment of the present invention.

Referring to FIG. 10, image forming apparatus 100 updates the guest user table in the following cases, such as when the image forming apparatus 100 gives authority to use to a new guest user, when the image forming apparatus 100 deletes the authority to use of the guest user, and when the image forming apparatus 100 changes the authority to use given to the guest user.

The guest user table is a table in which the information of the guest users to whom the authority to use of the image forming apparatus 100 is given is recorded, since the relationship of the SNS with the host user on the server is deep. The guest user table describes the name of each guest user, the name of the SNS using, the SNS account ID and password, the presence or absence of authority to use of each function of the image forming apparatus 100, and information on host users who are deeply involved.

According to the guest user table, a guest user named "GR 1" has an ID "a7902" and a password "3rk90s1" in the first SNS. It can be seen that the guest user named "GR 1" has the authority to use of the print function, the scan function, and the copy function. Also, it is understood that the guest user named "GR 1" has a deep relationship with the host user named "HR 1" in the first SNS.

According to the guest user table, it can be seen that the guest user named "GR 2" has a deep relationship with the plurality of host users named "HR 1", "HR 2", and "HR 3" in the second SNS. In the guest user table, the depth order of the relationship between each host user and the guest user GR 2 is further described. The order is "host user HR 2, host user HR 3, and host user HR 1".

Figure 11:
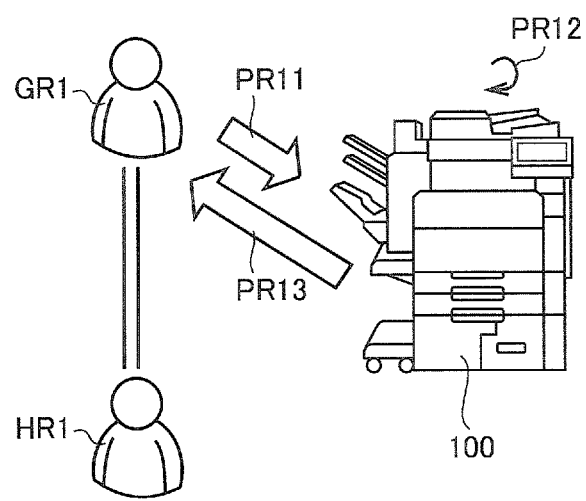
FIG. 11 is a diagram conceptually showing an operation of the authority granting system, when a guest user GR 1 having authority to use of the image forming apparatus 100 logs in, according to an embodiment of the present invention.

FIG. 11 is a diagram conceptually showing the operation of the authority granting system, when the guest user GR 1 having the authority to use of the image forming apparatus 100 logs in, in one embodiment of the present invention.

With reference to FIG. 10 and FIG. 11, when the guest user GR 1 logs in the second time and thereafter, the guest user GR 1 performs the login operation on the operation panel 108 using the SNS account in the same manner as in the case of FIG. 4. The image forming apparatus 100 accepts the selection of the SNS and the input of the SNS account information from the guest user GR 1 (process PR 11).

The image forming apparatus 100 refers to the guest user table. The image forming apparatus 100 determines whether the entered ID and password of the account of the SNS are registered in the guest user table (process PR 12).

When the entered ID and password of the account of the SNS are registered in the guest user table, the image forming apparatus 100 determines that the guest user GR 1 has the authority to use of the image forming apparatus 100. In this case, the image forming apparatus 100 refers to the guest user table. The image forming apparatus 100 permits the guest user GR 1 to use the print function, the scan function, and the copy function, which are functions provided with the authority to use to the guest user GR 1 (process PR 13).

[Operation of the Authority Granting System when Reviewing Authority to Use Granted to a Guest User]

When the guest user having the authority to use of the image forming apparatus 100 performs the login operation with the information of the SNS account, the image forming apparatus 100 permits the guest user to use the image forming apparatus 100 by the method shown in FIG. 11. However, after the authority to use of the image forming apparatus 100 is given to the guest user, it may be necessary to change the authority to use to be given to the guest user for the following reasons, such as occurrence of problem behavior of the guest user on SNS, changing the depth of relationship between the host user and the guest user, or the fact that the host user lost the authority to use of the image forming apparatus 100. Then, the image forming apparatus 100 revises the authority to use to be given to the guest user at a predetermined timing, after granting the authority to use of the image forming apparatus 100 to the guest user.

The above-mentioned predetermined timing is, for example, the following timing, such as when the guest user logs in for the first time after a certain period of time from the last user's login, or when the number of times the guest user logs in to the image forming apparatus 100 exceeds a predetermined number of times. In other words, the image forming apparatus 100 limits the number of times and the period of giving the authority to use to the guest user.

Figure 12:
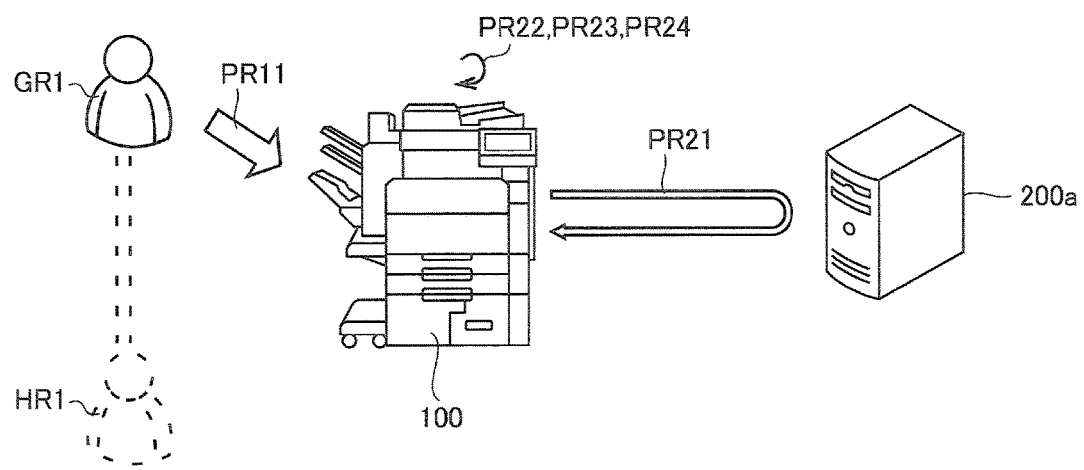
FIG. 12 is a diagram conceptually showing the operation of the authority granting system, in the case of reviewing the authority to use to be given to the guest user GR 1 in the embodiment of the present invention.

FIG. 12 is a diagram conceptually showing the operation of the authority granting system in the case of reviewing the authority to use to be given to the guest user GR 1 in the embodiment of the present invention.

Referring to FIG. 12, upon the second or subsequent logins of the guest user GR 1, the guest user GR 1 performs the login operation on the operation panel 108 using the information of the SNS account in the same manner as in the case of FIG. 4. The image forming apparatus 100 accepts the selection of the SNS and the input of the SNS account information from the guest user GR 1 (process PR 11).

At the predetermined timing, the image forming apparatus 100 accesses the cloud server 200a which is the cloud server 200 of the selected SNS. Next, the image forming apparatus 100 re-acquires the information registered in the SNS of the guest user GR 1 from the cloud server 200a by transmitting the information of the inputted account to the cloud server 200a (processing PR 21).

The image forming apparatus 100 corrects the authority to use granted to the guest user GR 1 (process PR 22), based on the information acquired from the cloud server 200a. That is, the image forming apparatus 100 corrects the evaluation of the presence or absence of problem behavior on the SNS of the user. The image forming apparatus 100 corrects the evaluation of the depth of the relationship on the SNS provided by the cloud server 200a, between the host user and the guest user GR 1.

Here, it is assumed that the host user HR 1 evaluated as having a high relationship with the guest user GR 1 loses the authority to use of the image forming apparatus 100, and the host user having a deep relationship with the guest user GR 1 no longer exists. In this case, the image forming apparatus 100 evaluates that the relationship between the host user and the guest user GR 1 is not deep. The image forming apparatus 100 does not grant authority to use to the guest user GR 1 and does not permit use of the image forming apparatus 100 (process PR 23). The image forming apparatus 100 deletes the information of the guest user GR 1 from the guest user table (process PR 24).

In other words, the guest user GR 1 was granted the authority to use of the image forming apparatus 100, because of its deep relationship with the host user HR 1. Therefore, when the host user HR 1 loses authority to use, guest user GR 1 also loses authority to use.

Figure 13:
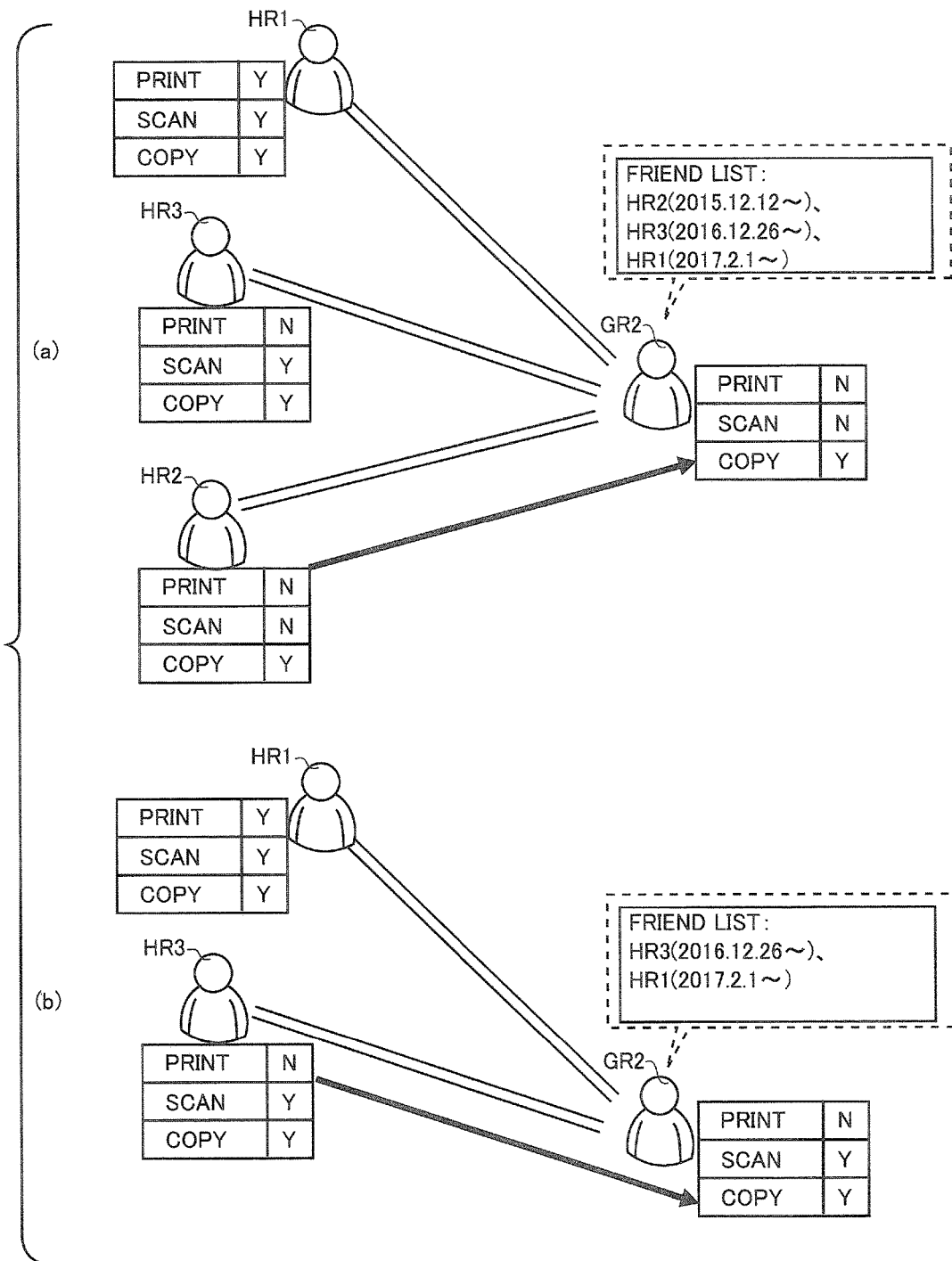
FIG. 13 is a diagram conceptually showing an example of review of authority to use granted to a guest user GR 2, in the case where there are multiple host users evaluated that the relationship with the guest user GR 2 on the SNS is deep, in one embodiment of the present invention.

FIG. 13 is a diagram conceptually showing an example of review of authority to use granted to a guest user GR 2 in an embodiment of the present invention, when there are multiple host users who evaluated that the relationship with guest user GR 2 on the SNS is deep. FIG. 13(a) is a diagram showing a state before review of the authority to use granted to the guest user GR 2. FIG. 13(b) is a diagram showing a state after reviewing the authority to use granted to the guest user GR 2.

With reference to FIG. 10 and FIG. 13, the following situation is assumed in this example. The guest user GR 2 uses the first SNS. Host users HR 1, HR 2, and HR 3 are included in the "friend list" of the guest user GR 2 in a state before the review of the authority to use granted to the guest user GR 2. The host users HR 1, HR 2, and HR 3 have different authorities to use. The host user HR 1 has the authority to use of the print function, the scan function, and the copy function of the image forming apparatus 100. The host user HR 2 has an authority to use of the copy function of the image forming apparatus 100. The host user HR 3 has authority to use of the scan function and the copy function of the image forming apparatus 100.

The period registered in the "close friend list" of the guest user GR 2 is long in the order of "the host user HR 2, the host user HR 3, and the host user HR 1". For this reason, the order of the depth of relationship with the guest user GR 1 described in the guest user table is the order "host user HR 2, host user HR 3, and host user HR 1". After the authority to use of the image forming apparatus 100 is given to the guest user GR 2, the host user HR 2 loses the authority to use of the image forming apparatus 100.

In the state (FIG. 13(a)) before reviewing the authority to use granted to the guest user GR 2, according to the method described in the above first example (FIG. 7), the image forming apparatus 100 determines the authority to use of the copy function which is the same authority to use as granted to the host user HR 2, for granting to the guest user GR 2.

The host user HR 2 is most closely related to the guest user GR 2 among the host users HR 1, HR 2, and HR 3.

At the time of reviewing the authority to use granted to the guest user GR 2 (FIG. 13 (*b*)), the host user HR 2 has lost authority to use of the image forming apparatus 100. When grasping this fact based on the information acquired from the cloud server 200*a*, the image forming apparatus 100 corrects the authority to use granted to the guest user GR 2. That is, the image forming apparatus 100 refers to the guest user table. The image forming apparatus 100 gives the guest user GR 2 the authority to use of the scan function and the copy function which are the same authority to use as granted to the host user HR 3. The host user HR 3 has a deep relationship with the guest user GR 1 after the host user HR 2.

[A Flowchart Showing Operation of the Image Forming Apparatus]

Figure 14:
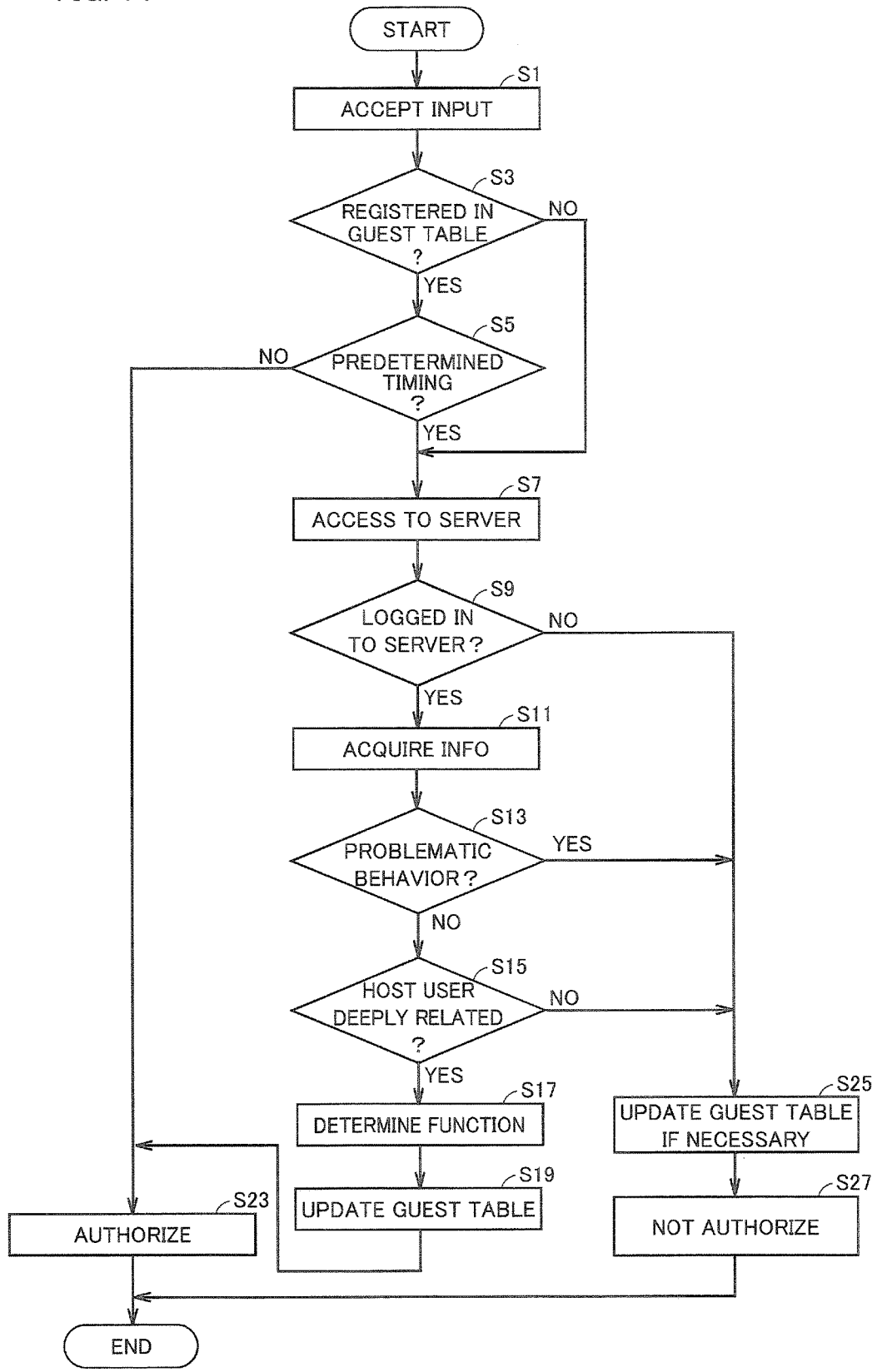
FIG. 14 is a flowchart showing the operation of the image forming apparatus 100, according to the embodiment of the present invention.

FIG. 14 is a flowchart showing the operation of the image forming apparatus 100 according to the embodiment of the present invention. This flowchart is realized by the CPU 101 works according to the control program stored in the ROM 102 or the storage device 104.

Referring to FIG. 14, upon receiving the selection of the SNS and the input of the SNS ID and the password from the user (S1), the CPU 101 judges whether or not the inputted ID and password are registered in the guest user table (S3).

In step S3, if it is determined that the entered ID and password are not registered in the guest user table (NO in S3), the user has not yet been granted authority to use. In this case, the CPU 101 proceeds to the processing of step S7.

In step S3, when it is determined that the entered ID and password are registered in the guest user table (YES in S3), the user has already been granted authority to use. In this case, the CPU 101 determines whether it is a predetermined timing (a timing of reviewing the authority to use to be given to the guest user) (S5).

In step S5, when it is determined that it is not the predetermined timing (NO in S5), the CPU 101 permits the user to use the function of the image forming apparatus 100 to which the authority to use is given in the guest user table (S23), and ends the processing.

In step S5, when it is determined that it is the predetermined timing (YES in S5), the process proceeds to step S7.

In step S7, the CPU 101 accesses the cloud server 200 of the selected SNS and attempts to log in with the inputted ID and password (S7). Subsequently, the CPU 101 determines whether or not it successfully logged in to the cloud server 200 of the SNS (S9).

In step S9, when it is determined that it successfully logged in to the cloud server 200 of the SNS (YES in S9), the CPU 101 acquires information registered in the user's SNS (S11). Based on the acquired information, the CPU 101 determines whether there is a problem behavior on the SNS of the user (S13).

In step S13, if it is determined that there is no problem behavior on the user's SNS (NO in S13), the CPU 101 discriminates whether or not there is a host user closely related to the guest user (S15).

In step S15, when it is determined that there is a host user having a great deal of relationship with the guest user (YES in S15), the function of the image forming apparatus 100 to which the authority to use is assigned is determined (S17), and the guest user table is updated (S19). Subsequently, the CPU 101 permits the user to use the functions of the image forming apparatus 100 to which the authority to use is attached in the guest user table (S23), and ends the processing.

The CPU 101 updates the guest user table as necessary (S25), when it is determined that the log-in to the cloud server 200 of the SNS was not successful (NO in S9) in step S9, when it is determined that there is a problem behavior on the SNS of the user (YES in S13) in step S13, or when it is determined that there is no host user having a great deal of relationship with the guest user (NO in S15) in step S15. Subsequently, the CPU 101 does not grant the authority to use of the image forming apparatus 100 to the user, disallows the use of the image forming apparatus 100 (S27), and terminates the process.

Effect of Embodiment

In the above-described embodiment, the authority to use of the image forming apparatus is granted to the guest user closely related to the host user (an introducer of the guest user) on the external system (SNS). Therefore, it is possible to easily grant the authority to use to the guest user while ensuring the minimum security. As a result, convenience can be improved while ensuring security.

Also, since the same authority to use as the authority to use possessed by the host user with a deep relationship is given to the guest user, more appropriate authority to use can be given to the guest user.

[Others]

In the embodiment described above, the same user authority to use as the authority to use granted to the host user deeply related to the guest user is given to the guest user. The authority to use granted to the guest user may be the authority to use determined based on the authority to use granted to the host user. The authority to use granted to the guest user need not be the same authority to use granted to the host user.

In the above-described embodiment, the image forming apparatus determines whether to grant authority to use to the guest user, based on the evaluation of the presence or absence of a problem behavior on the guest user's SNS and the evaluation of the depth of the relationship on the SNS provided by the server, between the host user and the guest user. The image forming apparatus may omit evaluation of the presence or absence of a problem behavior on the SNS of the guest user. That is, it may be determined whether to grant authority to use to the guest user, based on only the evaluation of the depth of the relationship on the SNS provided by the server, between the host user and the guest user.

The processes in the above-mentioned embodiments can be performed by software and a hardware circuit. A computer program which executes the processes in the above embodiments can be provided. The program may be provided recorded in recording media of CD-ROMs, flexible disks, hard disks, ROMs, RAMs, memory cards, or the like to users. The program is executed by a computer of a CPU or the like. The program may be downloaded to a device via communication lines like the interne. The processes explained in the above flowcharts and the description are executed by a CPU in line with the program.

Although the present invention has been described and illustrated in detail, the disclosed embodiments are made for purposes of illustrated and example only and not limitation. The scope of the present invention being interpreted by terms of the appended claims.

What is claimed is:

1. An authorization device comprising a hardware processor, to grant authority wherein the hardware processor evaluates a depth of a social relationship on a social networking service used by a plurality of users, between a host user to whom an authority for using a device was given and a guest user different from the host user, wherein the depth of the social relationship is determined based on a type of relationship defined on the social network service and at least one of a number of mutual friends, and interactions between the host user and guest user, and the hardware processor grants an authority to the guest user to use the device, based on the evaluation result, wherein the authority granted to the guest user is the same authority given to the host user.

2. The authorization device according to claim 1, wherein the hardware processor evaluates that the relationship between the host user and the guest user on the service is deep, when the host user and the guest user have a predetermined cooperative relationship on the service.

3. The authorization device according to claim 1, wherein the hardware processor evaluates that the relationship between the host user and the guest user on the service is deep, when the host user and the guest user have exchanged messages on the service.

4. The authorization device according to claim 1, wherein the hardware processor evaluates presence or absence of a predetermined behavior on the service of the guest user, the hardware processor does not grant the authority to the guest user irrespective of the evaluation result of the depth of relationship, if it is evaluated that there is the predetermined behavior on the service of the guest user, and the hardware processor grants the authority to the guest user based on the evaluation result of the depth of relationship, if it is evaluated that there is not the predetermined behavior on the service of the guest user.

5. The authorization device according to claim 4, wherein the hardware processor evaluates that there is a predetermined behavior on the service of the guest user, when the guest user has exchanged a message with a predetermined user on the service.

6. The authorization device according to claim 4, wherein the hardware processor evaluates that there is a predetermined behavior on the service of the guest user, when the guest user is participating in a predetermined group on the service.

7. The authorization device according to claim 4, wherein the hardware processor evaluates that there is a predetermined behavior on the service of the guest user, when the guest user discloses a predetermined keyword on the service.

8. The authorization device according to claim 4, wherein the hardware processor evaluates that there is a predetermined behavior on the service of the guest user, when the guest user does not follow predetermined security policy on the service.

9. The authorization device according to claim 1, wherein there are a plurality of host users evaluated that the relationship with the guest user on the service is deep, and the hardware processor determines the authority granted to the guest user, based on an authority assigned to the host user having the greatest relation to the guest user among the plurality of host users, when granting an authority to the guest user based on the evaluation result of the depth of relationship.

10. The authorization device according to claim 9, further comprising an order storing unit for storing depth order of the relationship between each of the plurality of host users and the guest user, wherein the hardware processor corrects the authority granted to the guest user, based on the authority assigned to the host user who is second in the order stored in the order storing unit, in a case where the host user who is most closely related to the guest user has lost the granted authority after granting the authority to the guest user.

11. The authorization device according to claim 1, wherein there are a plurality of host users evaluated that the relationship with the guest user on the service is deep, and the hardware processor determines the authority granted to the guest user, based on the authority of the host user who is granted the most authority among the plurality of host users, when granting an authority to the guest user based on the evaluation result of the depth of relationship.

12. The authorization device according to claim 1, wherein there are a plurality of host users evaluated that the relationship with the guest user on the service is deep, and the hardware processor determines the authority granted to the guest user, based on authority commonly assigned to all of the plurality of the host users, when granting an authority to the guest user based on the evaluation result of the depth of relationship.

13. The authorization device according to claim 1, wherein the hardware processor can evaluate the depth of the relationship between the host user and the guest user on each of a plurality of services.

14. The authorization device according to claim 1, wherein the hardware processor accepts input of information of an account of the guest user in the service, the hardware processor acquires information registered in the service of the guest user from a server by transmitting the information of the account to the server that provides the service, and the hardware processor evaluates the depth of the relationship between the host user and the guest user on the service, based on the information acquired.

15. The authorization device according to claim 14, wherein the hardware processor acquires information registered in the service of the guest user from the server, by transmitting the information of the account to the server providing the service, after granting the authority to the guest user, and the hardware processor corrects the evaluation result of the relationship depth, based on the acquired information.

16. A non-transitory computer-readable recording medium storing a controlling program for an authorization device to grant authority, wherein the program causes a computer to execute the steps of:

evaluating depth of a social relationship on a social networking service used by a plurality of users, between a host user to whom an authority for using a device is given and a guest user different from the host user, wherein the depth of the social relationship is determined based on a type of relationship defined on the social networking service, and at least one of a number of mutual friends, and interactions between the host user and guest user, and granting an authority to the guest user to use the device, based on the evaluation result, wherein the authority granted to the guest user is the same authority given to the host user.

\* \* \* \* \*